July 25, 1944. C. R. BABB 2,354,289
MECHANISM FOR REMOVING WELDING BURRS
Filed June 6, 1940 2 Sheets-Sheet 1
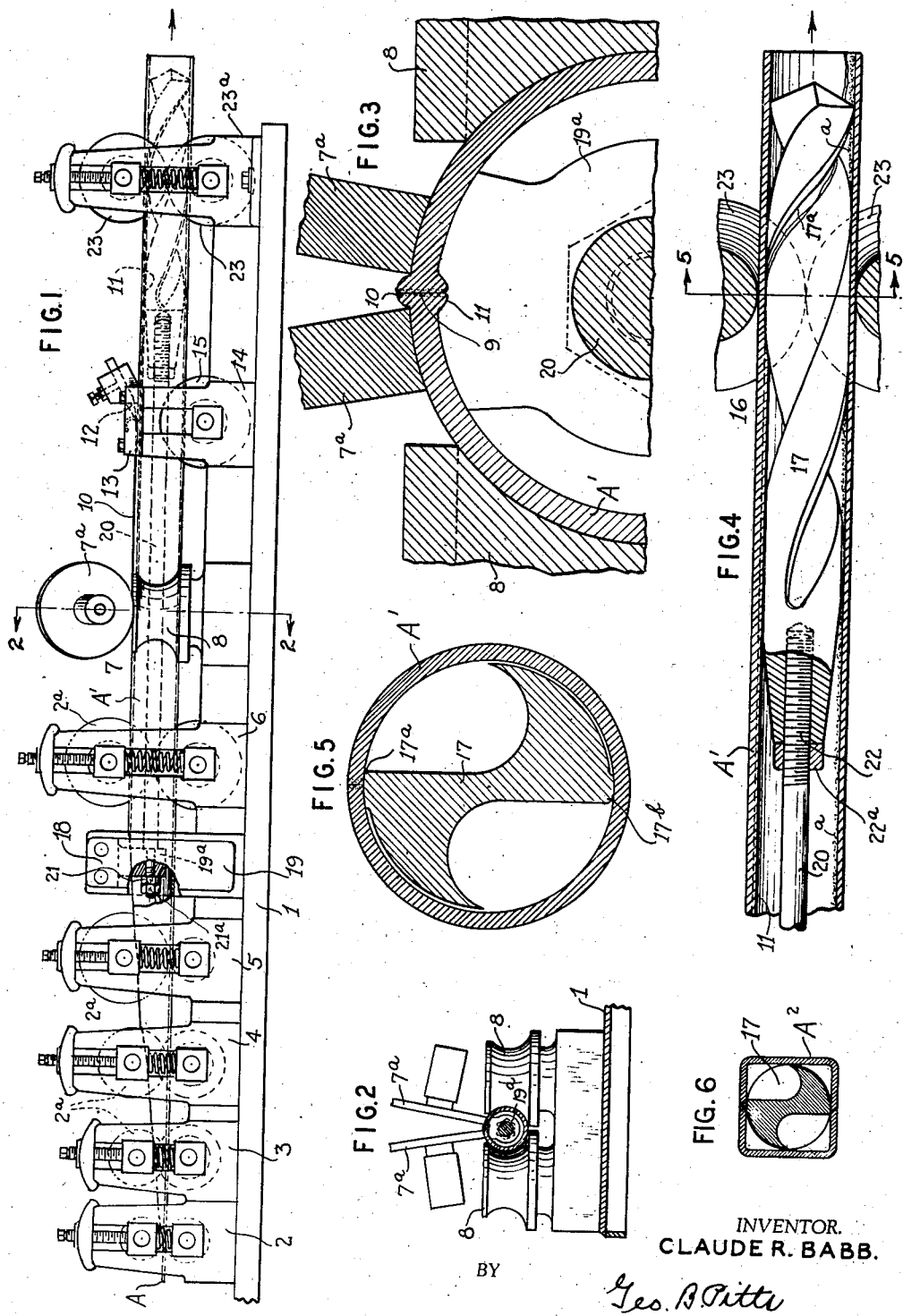
INVENTOR.
CLAUDE R. BABB.
BY Geo. B Pitts
ATTORNEY.

July 25, 1944.   C. R. BABB   2,354,289
MECHANISM FOR REMOVING WELDING BURRS
Filed June 6, 1940   2 Sheets-Sheet 2
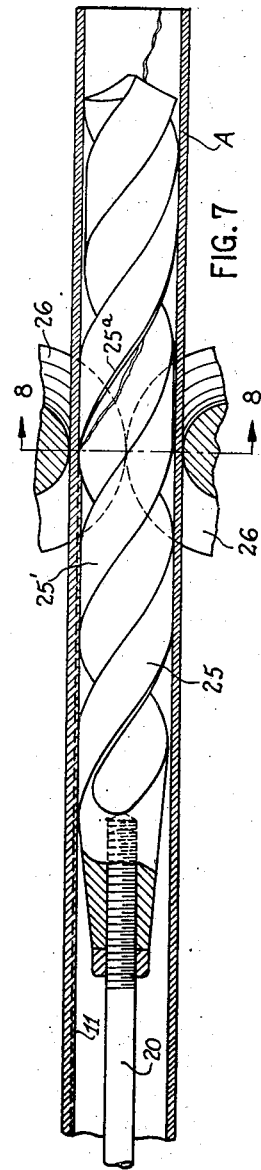
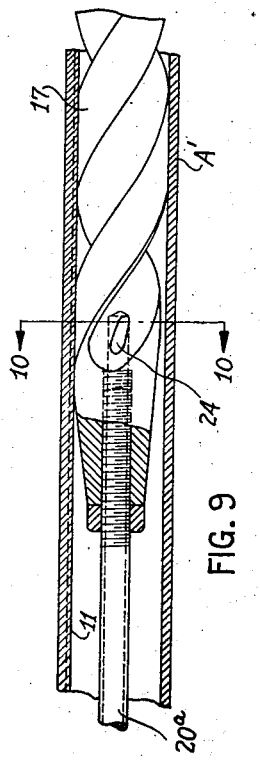
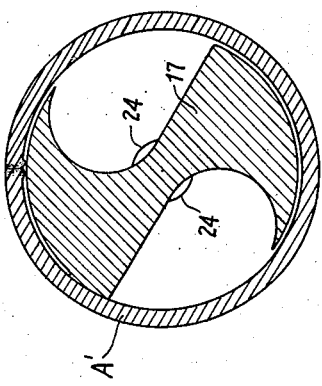
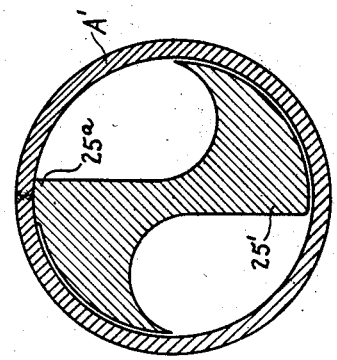
INVENTOR
CLAUDE R. BABB
BY Geo. B. Pitts
ATTORNEY Patented July 25, 1944

2,354,289

UNITED STATES PATENT OFFICE 2,354,289

MECHANISM FOR REMOVING WELDING BURRS

Claude R. Babb, Lakewood, Ohio, assignor to The Yoder Company, Cleveland, Ohio, a corporation of Ohio Application June 6, 1940, Serial No. 339,045

6 Claims. (Cl. 90—33)

This invention relates to apparatus for making hollow bodies having a welded seam, more particularly means for removing or shearing off the welding burr on the internal surface of the bodies. The internal burr removing means are preferably combined with mechanism for continuously forming sheet metal into hollow form, with the side edges of the sheet metal brought into close side by side relation, welding the side edges, and removing the external burr from the form, whereby upon the removal of the internal burr, the form is completed ready for sizing, straightening and cutting into sections.

One object of the invention is to provide an improved means of simplified construction for removing the welding burr on the inner wall of hollow bodies.

Another object of the invention is to provide an improved shearing device arranged to fit within a hollow body and adapted upon relative movement between the device and body to remove or shear off the welding burr on the internal wall of the body.

Another object of the invention is to provide an improved device for shearing off the welding burr on the internal wall of a hollow body, the device being supported by the internal wall thereof and having a cutting edge disposed at a substantially inclined angle to the burr and arranged to shear it off due to relative movement between the body and device.

A further object of the invention is to provide an improved unitary tool adapted to fit within a hollow body and having a curvilinear cutting edge extending at an angle to the burr to shear it off as the body moves longitudinally.

Other objects of the invention will be apparent to those skilled in the art to which my invention relates from the following description taken in connection with the accompanying drawings.

My internal burr shearing means are combined or associated with a mechanism for continuously forming a hollow body, preferably cylindrical in cross section, since such mechanism permits the burr cutter or shearer to be readily mounted within the body, the feed of the material to and through the forming passes provides for the relative movement between the hollow body and the cutter or shearer longitudinally of the burr and it permits of the removal of the burr before the final sizing, straightening and cutting of the hollow body into predetermined lengths or sections, and the time, labor and equipment required to position the shearing device into each section and its removal therefrom are eliminated.

Fig. 1 is a side elevation of an apparatus for continuously forming sheet metal as it comes from the mill into cylindrical form, the welding means for the form being shown semi-diagrammatically, and an internal burr removing means embodying my invention.

Fig. 2 is a fragmentary section on the line 2—2 of Fig. 1.

Fig. 3 is a fragmentary view similar to Fig. 2, enlarged.

Fig. 4 is a fragmentary longitudinal section of the hollow body or cylinder showing the cutting device in position therewithin and the pressure members.

Fig. 5 is a fragmentary section on the line 5—5 of Fig. 4, enlarged.

Fig. 6 is a view similar to Fig. 5, but applied to a hollow body that is non-circular in cross section.

Fig. 7 is a view similar to Fig. 4, but showing a modified form of cutting device.

Fig. 8 is a section on the line 8—8 of Fig. 7.

Fig. 9 is a view similar to Figs. 4 and 7, but showing another modified form of cutting device.

Fig. 10 is a section on the line 10—10 of Fig. 9, enlarged.

In the drawings, 1 indicates as an entirety a bed or base on which are mounted pairs of housings or standards 2, 3, 4, 5 and 6, each pair supporting a set of forming rolls 2a through which sheet metal A is fed. The forming rolls 2a of each set are driven in any suitable manner so as to feed the sheet metal A endwise. The sets of rolls progressively form the sheet metal A into a hollow form A' with its opposite side edges in alined, contact relation. The form A' then moves to and through a suitable welding means indicated as an entirety at 7. The welding means may be of any standard or conventional construction, but for illustrative purposes I have shown two electrodes 7a, 7a, and a pair of squeeze rolls 8 engaging the opposite sides of the formed body A' below the electrodes; the electrodes 7a, 7a, being adapted to be electrically connected to the terminals of the secondary windings of a suitable transformer to which current is supplied, whereby the electrical resistance setup between the contacting side edges of the body A' welds them, as shown at 9, the fused metal forming an external burr 10 and an internal burr 11. The formed pipe A' then feeds past a suitable cutter 12, mounted on a bridge 13, for shearing off the external burr 10 as the body A' moves endwise. The bridge 13 is supported on a pair of housings 14 provided with bearings for the shaft of a roll 15, which is arranged to support the formed body A' directly below the cutter 12.

16 indicates as an entirety means for removing or shearing off the internal burr 11. The burr removing means 16 consist of a cutting tool or device 17 mounted within the body A' and a fixture 18 connected to the device 17, for holding it stationary, since the body A' is fed endwise as already set forth, and thus moves relative to the device. The fixture 18 consists of an inverted substantially U-shaped casting 19 fitting over the moving stock or sheet metal A and suitably secured to the base 1 between the housings 5 and 6 and a depending arm 19a, this arrangement permitting the shearing device to be anchored to a support positioned in advance of the final formation of the sheet metal A into hollow form. The arm 19a is formed with a through opening in substantially axial relation to the axis of the body A' to receive the reduced outer end portion of a rod 20, such end portion being threaded to take nuts 21, 21a, which are tightened against the outer side of the arm 19a, in opposition to the shoulder formed by its reduced end, to rigidly secure the rod 20 to the arm 19a. By loosening the nuts the rod 20 may be rotated, whereby the cutting device 17 may be adjusted angularly, for a purpose later set forth. The inner end of the rod 20 is connected to the adjacent end of the cutting device 17 in any desired manner; for example, by providing screw threads 22 on the inner end portion of the rod and screwing it into a threaded opening formed axially in the end of the cutting device 17. The cutting device 17 may be locked to the rod 20 by a jam nut 22a. By loosening the nut 22a, the device 17 may be adjusted axially of the rod and also angularly thereof, although when it is desired to adjust the device 17 angularly I prefer to rotate the rod 20, as already set forth, as such adjustment does not require the removal of the device. The cutting device 17 comprises an elongated body having on its upper side a cutting edge 17a which extends spirally relative to the axis thereof and is disposed in the path of movement of the burr 11 and serves to shear off the latter as the body A' feeds endwise. The cutting device 17 has a diameter which approximates the internal diameter of the body A', whereby the walls of the latter support the device substantially centrally of the body and permits the movement thereof relative to the cutting device. By preference, the cutting device 17 consists of a twist drill of conventional construction, an intermediate upper portion of one lateral cutting edge thereof being utilized to shear off the burr 11. Due to the fact that the cutting device is slightly smaller in diameter than the internal diameter of the body A' I provide a pair of pressure rolls 23 which engage the top and bottom portions of the body A' in line with the shearing off point of the cutting edge 17a and serve to compress the upper wall of the body A' sufficiently so that such edge shears the burr off evenly or flush with the inner surface of the body (see Fig. 5). When a twist drill is employed, the cutting edge thereof opposite the point of shear is rounded off as shown at 17b in Fig. 5 and the outer surfaces of the flutes in advance of the edge employed to shear off the burr are ground off to prevent contact with the burr 11. The pressure rolls 23 are suitably mounted in housings 23a and may be driven if desired. The housings 23a are adjustable along the base 1 in either direction so as to position the pressure rolls 23 in line with the point of shear. By reason of the fact that the cutting edge 17a is spirally shaped, the device 17 may be adjusted angularly to bring a contiguous portion of such edge into cutting or shearing position, that is, in the path of movement of the burr 11, so that the tool may be used for a long period of time without requiring sharpening or replacement. When the shearing tool 17 consists of a twist drill or is otherwise shaped in cross section to engage the side walls of the body A', it may be used for hollow bodies A² of polygonal shape in cross section, one example of which is shown in Fig. 6.

The sheared off internal burr is guided to the lower portion of the form and conveyed away with other foreign matter (welding spatterings and scale) by the moving form. However, by substituting a pipe 20a (see Figs. 9 and 10) for the rod 20, having at its inner end a connection with a liquid flushing material (such as water) supplied under pressure and providing one or more openings 24 in the shank of the tool in connected relation to the inner end of the pipe 20a, the foreign matter may be flushed out simultaneously with the operation of removing the internal burr 11.

Figs. 7 and 8 illustrate another modification. In these views, 25 indicates the tool having a cutting edge 25a extending spirally relative to the axis of the tool. As shown, that portion of the edge 25a between and in line with the pressure rolls 26 serves to shear off the internal burr 11, and portions of the edge 25a in advance and rearward of the shear off position engage with the opposite side of the form A' so as to support the tool on opposite sides of that portion of the edge which shears off the burr. A twist drill may be advantageously used, as shown; however, where a twist drill is employed the other flute 25' and its cutting edge is ground off to prevent contact thereof with the burr 11 and walls of the form A'.

To those skilled in the art to which my invention relates many changes in construction and widely differing embodiments of the invention will be apparent without departing from the spirit and scope thereof. My disclosures and the description herein are purely illustrative and not intended to be in any sense limiting.

What I claim is:

1. In a machine for shearing off the welding burr on the inner wall of a hollow member, the combination with a support and means for moving the hollow member endwise, of a cutting device comprising an elongated body fixedly connected at its inner end to said support and having spaced side portions slidably fitting the inner walls of the hollow member and forming between them channels open at the outer end of said elongated body, a portion of one of said side portions terminating in a cutting edge disposed in substantially inclined relation to the burr and in the path of movement thereof and arranged to shear off the burr along a transversely inclined line due to longitudinal movement of the hollow member relative to said device.

2. A machine as claimed in claim 1, wherein are provided pressure applying means diametrically engaging the member opposite to the point of shear by said cutting edge.

3. In a machine of the class described, the combination with a support and means thereon for feeding endwise a hollow member having on its inner wall a welding burr, of a shearing device fixedly mounted within the member and having longitudinally extending spaced side portions supported on and slidably fitting the inner wall of the hollow member, one of said side portions terminating in a cutting edge extending spirally relative to the axis of said device and disposed in the path of movement of the burr for shearing it off, and pressure applying means diametrically engaging the member opposite to the point of shear by said cutting edge.

4. In a machine of the class described, the combination with a support and means thereon for feeding endwise a hollow member having on its inner wall a welding burr, of a shearing device fixedly mounted within the member and having longitudinally extending spaced side portions supported on and slidably fitting the inner wall of the hollow member, one of said side portions terminating in a cutting edge extending spirally relative to the axis of said device and disposed in the path of movement of the burr for shearing it off, means for adjusting said device angularly, and pressure applying means diametrically engaging the member opposite to the point of shear by said cutting edge, said pressure applying means being adjustable longitudinally of said hollow member.

5. In apparatus of the class described, the combination with a support and means thereon for moving a hollow member endwise, a tubular member connected to said support and extending into said hollow member, and a tool connected to the inner end of said tubular member and comprising a spirally shaped wall, portions of which have sliding engagement with the wall of said hollow member and another portion of which terminates in a spiral cutting edge arranged to remove the burr on the hollow member as the latter moves endwise, the inner end portion of said tool being formed with a port to connect the opening in said tubular member with the space at one side of said spiral wall.

6. In a machine of the class described, the combination with a support and means thereon for moving endwise a hollow member having on its inner wall a longitudinally extending welding burr, of a cutting device comprising an elongated body engaging the inner walls of said moving member and connected at its inner end to said support to prevent movement of said device with said member, a portion of said device being formed with a spiral groove forming a channel open at its outer end and a portion of the outer wall of said groove having a cutting edge disposed in substantially inclined relation to the burr and in the path of movement thereof and arranged to shear off the burr along a transversely inclined line due to the longitudinal movement of the hollow member relative to said device, and pressure applying means diametrically engaging the member opposite to the point of shear by said cutting edge.

CLAUDE R. BABB.